United States Patent [19]

Stevens

[11] Patent Number: 5,477,948

[45] Date of Patent: Dec. 26, 1995

[54] SHOCK ABSORBER ADAPTER AND METHOD

[76] Inventor: Anthony Stevens, P.O. Box 734, Yankton, S. Dak. 57078

[21] Appl. No.: 398,907

[22] Filed: Mar. 6, 1995

[51] Int. Cl.⁶ ........................................................ F16F 9/44
[52] U.S. Cl. ........................ 188/322.11; 267/221; 267/34
[58] Field of Search ............................. 188/318, 321.11, 188/322.11; 267/34, 170, 179, 221, 286; 280/666, 667, 668; 29/401.1

[56] References Cited

U.S. PATENT DOCUMENTS

| | | | |
|---|---|---|---|
| 2,832,091 | 4/1958 | Noyes | 267/221 |
| 3,160,406 | 12/1964 | Dickinson | 267/221 |
| 3,251,591 | 5/1966 | McNally | 267/221 |
| 3,794,309 | 2/1974 | Chrokey et al. | 267/34 |
| 4,366,969 | 1/1983 | Benya et al. | 267/34 |
| 4,744,444 | 5/1988 | Gillingham | 267/221 |
| 5,044,614 | 9/1991 | Rau | 267/221 |

*Primary Examiner*—Robert J. Oberleitner
*Assistant Examiner*—Chris Schwartz
*Attorney, Agent, or Firm*—Zarley, McKee, Thomte, Voorhees & Sease; Mark D. Frederiksen

[57] ABSTRACT

A shock absorber adapter kit includes an elongated barrel having a cavity formed therein open at an upper end of the barrel. A conventional shock absorber is modified by removing the lower shock mount and then inserted in the barrel cavity with the shock absorber plunger projecting upwardly out of the barrel. A securement ring with an exterior thread is threaded onto the interior threads formed in the upper end of the barrel cavity to secure the shock absorber receiver tube within the barrel. The shock absorber plunger extends through a central opening in the ring so that the shock absorber upper shock mount may be connected to the vehicle frame. A coil spring is journaled on the barrel and upward against the upper spring seat on the vehicle frame, with a lower spring seat threaded onto exterior threads along the exterior surface of the barrel. A lower shock mount on the lower end of the barrel is connected to the vehicle axle assembly to form a shock absorbing suspension unit on the vehicle. Rotational movement of the lower spring seat permits length adjustment of the spring suspension unit, which increases or decreases the vehicle's ground clearance.

13 Claims, 4 Drawing Sheets

SHOCK ABSORBER ADAPTER AND METHOD

TECHNICAL FIELD

The present invention relates generally to adapter kits for shock absorbers, and more particularly to an improved shock absorber adapter and method for conversion of a stock shock absorber into a length-adjustable shock absorber.

BACKGROUND OF THE INVENTION

There are many types of variable length shock absorbers which are currently available on the market. However, the replacement of the existing automobile shock absorber with an adjustable shock absorber can be quite expensive.

A prior art adapter kit is available which includes a threaded sleeve with an interior counter bore which will receive a snap ring installed in a groove in the reserve tube at the shock absorber. This positions the exteriorly threaded sleeve on the outside of the shock absorber reserve tube. An adjustable lower spring seat is threaded on the exterior of the threaded sleeve and an upper spring seat is connected to the upper shock mount on the plunger rod of the shock absorber. Rotation of the lower spring seat on the threaded sleeve thereby permits an adjustment in the distance between the upper and lower spring seats, which raises or lowers a vehicle's ground clearance.

However, the conventional adapter kit has several drawbacks. First, the threaded sleeve has an interior diameter which must be matched to the exterior diameter of the particular shock absorber to which it will be attached, in order to permit interconnection between the threaded sleeve and shock absorber with the snap ring. Thus, the conventional adapter kit will not fit a wide variety of shock absorber sizes.

In addition, the use of a snap ring between the shock absorber reserve tube in the threaded sleeve does not always provide the desired secured connection between these two members.

SUMMARY OF THE INVENTION

It is therefore a general object of the present invention to provide an improved shock absorber adapter kit.

Another object of the present invention is to provide a shock absorber adapter which will accept a wide variety of shock absorber sizes.

A further object is to provide a shock absorber adapter which permits the use of a completely aluminum shock barrel.

Still another object is to provide a shock absorber adapter which allows the use of the original upper spring seat of the existing suspension unit.

These and other objects will be apparent to those skilled in the art.

The shock absorber adapter kit of the present invention includes an elongated barrel having a cavity formed therein open at an upper end of the barrel. A conventional shock absorber is modified by removing the lower shock mount and then inserted in the barrel cavity with the shock absorber plunger projecting upwardly out of the barrel. A securement ring with an exterior thread is threaded onto the interior threads formed in the upper end of the barrel cavity to secure the shock absorber receiver tube within the barrel. The shock absorber plunger extends through a central opening in the ring so that the shock absorber upper shock mount may be connected to the vehicle frame. A coil spring is journaled on the barrel and upward against the upper spring seat on the vehicle frame, with a lower spring seat threaded onto exterior threads along the exterior surface of the barrel. A lower shock mount on the lower end of the barrel is connected to the vehicle axle assembly to form a shock absorbing suspension unit on the vehicle. Rotational movement of the lower spring seat permits length adjustment of the spring suspension unit, which increases or decreases the vehicle's ground clearance.

DESCRIPTION OF THE PREFERRED EMBODIMENT

Figure 1:
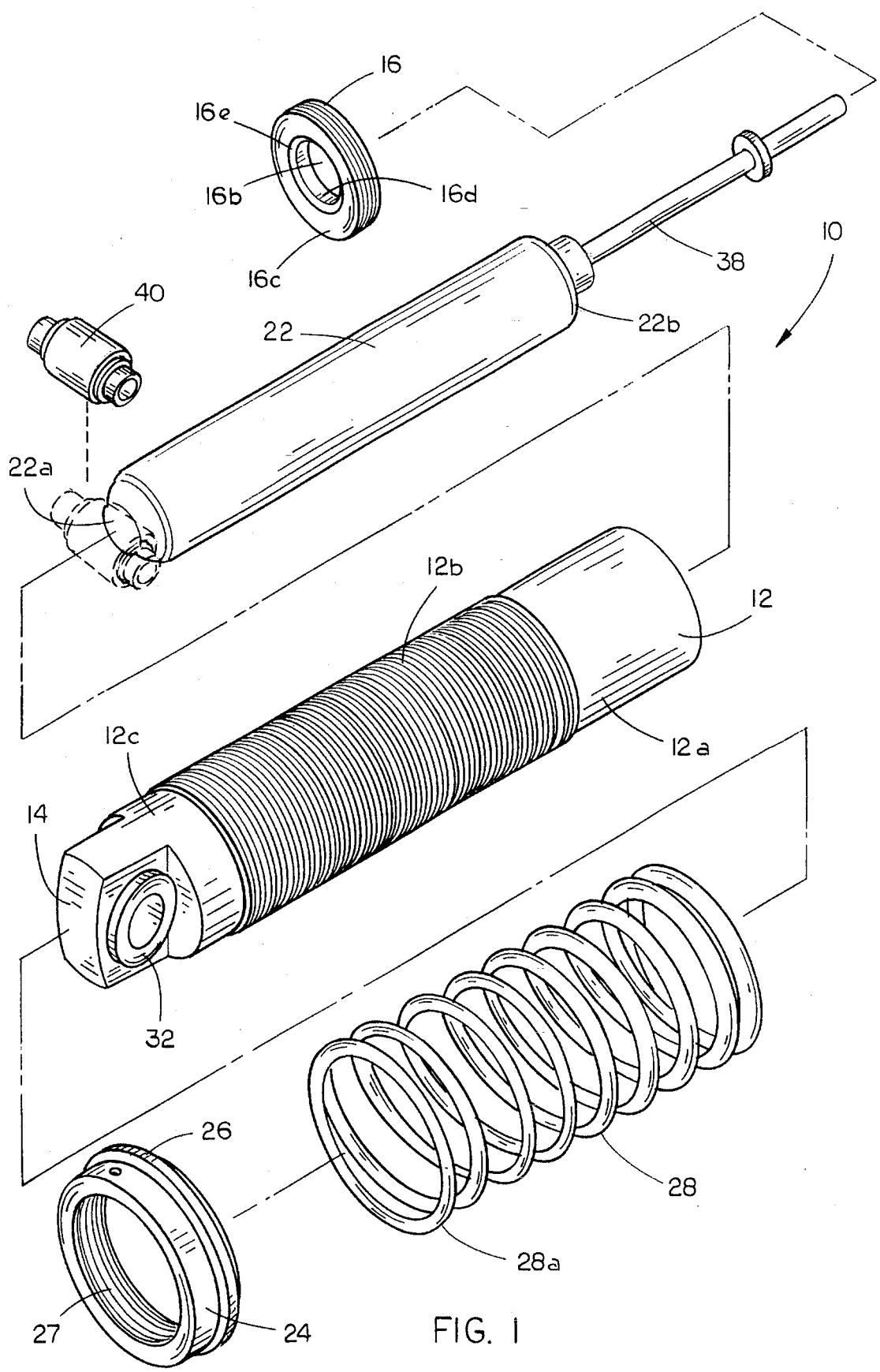
FIG. 1 is an exploded perspective view of the shock absorber adapter of the present invention with a conventional shock absorber modified for use therewith.

Referring now to the drawings, in which similar or corresponding parts are identified with the same reference numeral, and more particularly to FIG. 1, the shock absorber adapter kit of the present invention is designed generally at 10 and includes an aluminum barrel 12 with a shock mount 14 formed in one end thereof, and a removable ring 16 engageable with the opposite end thereof.

Figure 2:
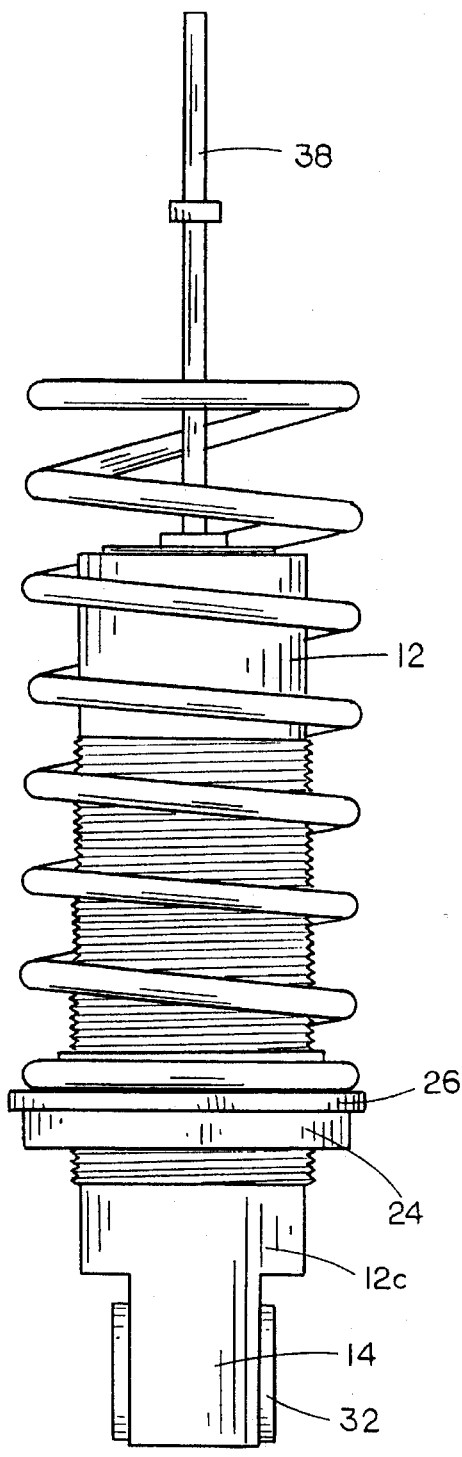
FIG. 2 is a side elevational view of the shock absorber adapter with the modified shock absorber installed therein.
Figure 3:
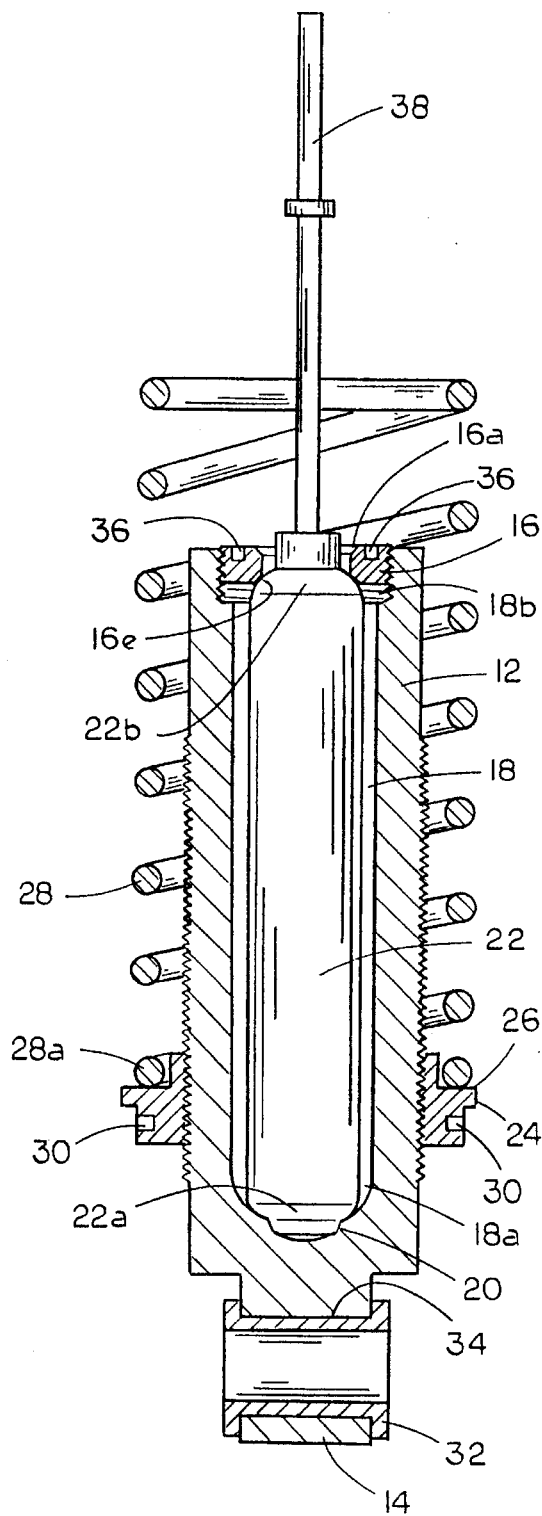
FIG. 3 is a vertical sectional view through the shock absorber adapter of FIG. 2.

Referring now to FIGS. 1–3, barrel 12 is preferably formed of aluminum, with a cylindrical cavity 18 (shown in FIG. 3) formed therein. The lower end 18a of cavity 18 has a depression 20 formed centrally therein which conforms to the shape of the lower end 22a of modified shock absorber 22 (as described in more detail hereinbelow).

The exterior surface 12a of barrel 12 is threaded to receive an annular lower spring seat 24 thereon. Lower spring seat 24 includes an interior thread 27 which will engage barrel threads 12b, and an outwardly projecting annular flange 26 which forms the seat for the lower end 28a of coil spring 28. A pair of diametric apertures 30 receive the end of a tool to permit rotation of lower spring seat 24 on barrel 12.

Shock mount 14 is formed in the lower end 12c of barrel 12, and includes a rubber bushing 32 installed within a hole 34 oriented transversely to the longitudinal axis of barrel 12, in a conventional fashion.

Referring to FIG. 3, the upper end 18b of cavity 18 is interiorly threaded, and opens outwardly from barrel 12 to receive shock absorber 22. Securement ring 16 has an exterior diameter matching the interior diameter of cavity upper end 18b, and is exteriorly threaded to engage the interior threads of cavity upper end 18b. The upper annular surface 16a of ring 16 includes a pair of apertures 36 therein which will receive a tool to permit rotation of ring 16 within the upper end of barrel 12. Ring 16 includes a central opening 16b, through which plunger 38 of shock absorber 22 is journaled. The juncture between the lower surface 16c and inner wall surface 16d preferably has a bevel 16e which will be placed in flush contact with the curved upper end 22b of shock absorber 22, as shown in FIG. 3.

FIG. 1 shows the modification of stock shock absorber 22, wherein the lower shock mount 40 is removed to form a smooth lower end 22a on shock absorber 22. In this way, shock absorber 22 is inserted within barrel 12, as shown in FIG. 3, with the lower end 22a in close fitting contact with depression 20 in cavity 18 and the upper end 22b held snugly in position by securement ring 16 at the upper end of cavity 18.

The method of use of the present invention includes the initial step of modifying a conventional shock absorber 22 by removing the lower shock mount 40 affixed to the lower end of the shock absorber receiver tube, and smoothing the lower end 22a thereof. Shock absorber 22 is then inserted within barrel 12 with the lower end 22a inserted into depression 20 and plunger 38 projecting outwardly from the upper end of barrel 12. Securement ring 16 is then journaled over plunger 38 and threaded into the upper end of barrel 12 with bevel edge 16e affixed snugly against the upper end of shock absorber receiver tube 22.

Figure 4:
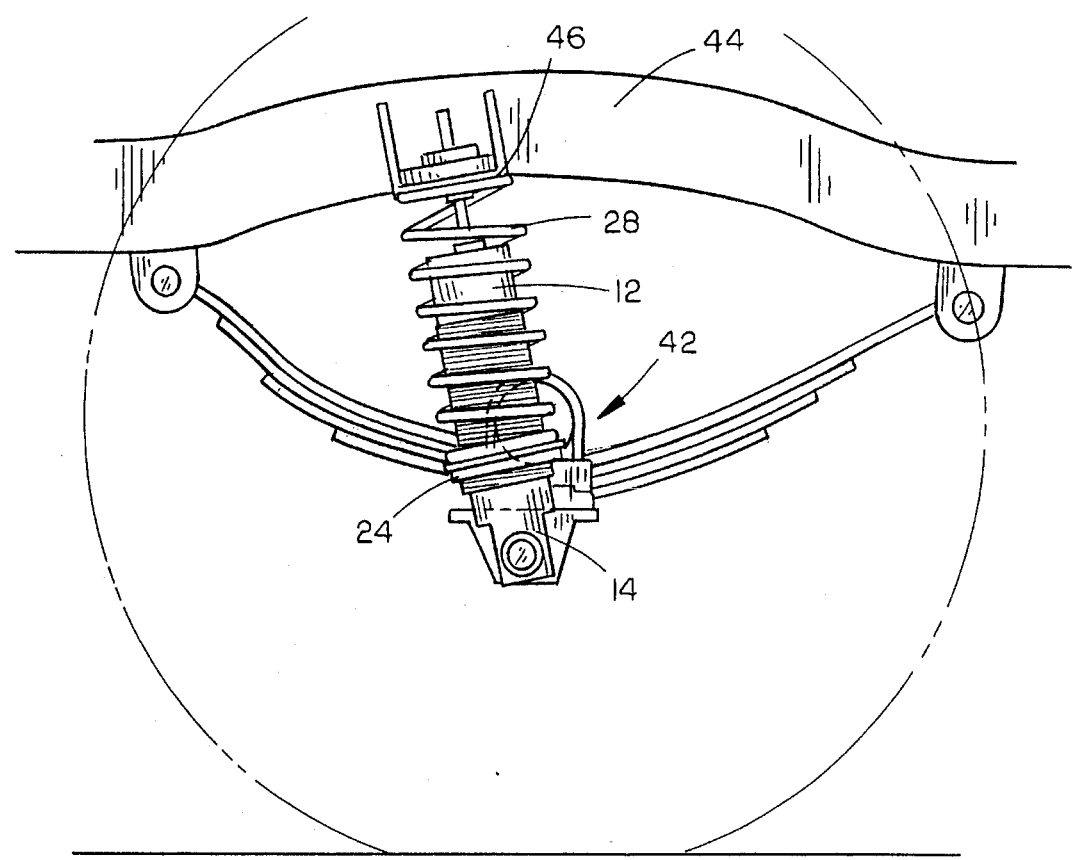
FIG. 4 is an elevational view of the shock absorber adapter installed on a suspension unit.

Once shock absorber 22 is installed within barrel 12, the lower spring seat 24 is threaded onto barrel 12 and spring 28 seated thereon. The lower shock mount 14 is then attached to axle assembly 42, as shown in FIG. 4, and the upper shock mount (not shown) is attached to frame 44 in a conventional manner. The upper end of spring 28 is seated against the existing upper spring seat 46 attached to frame 44.

Figure 5:
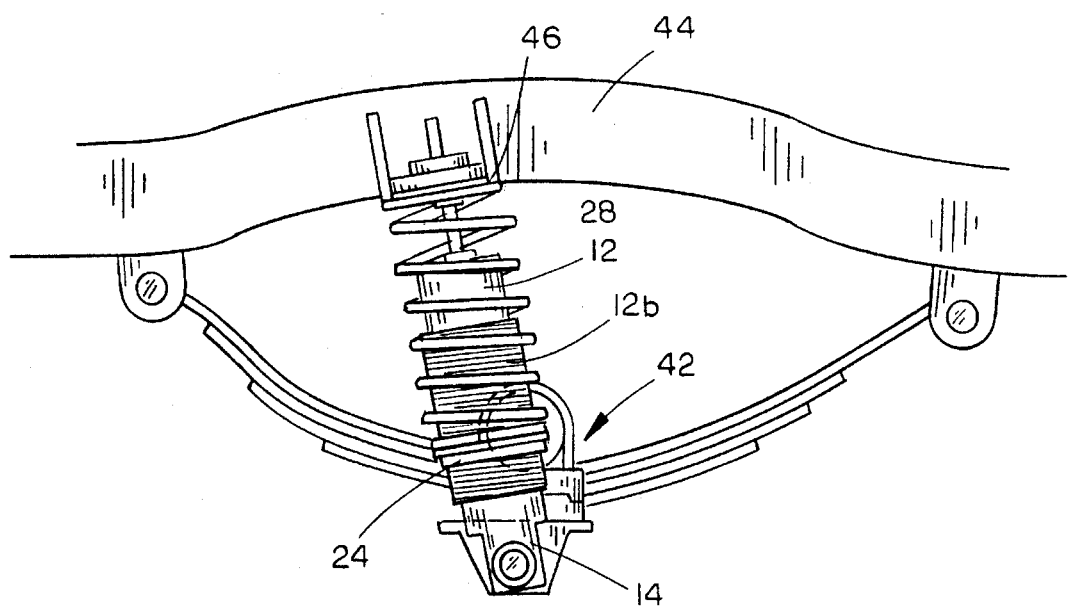
FIG. 5 is a view similar to FIG. 4 with the adapter adjusted to vary the length between the upper and lower spring seats.

As shown in FIG. 5, the distance between frame 44 and axle assembly 42 may be adjusted by rotating lower spring seat 24 on the threaded portion 12b of barrel 12.

Figure 6:
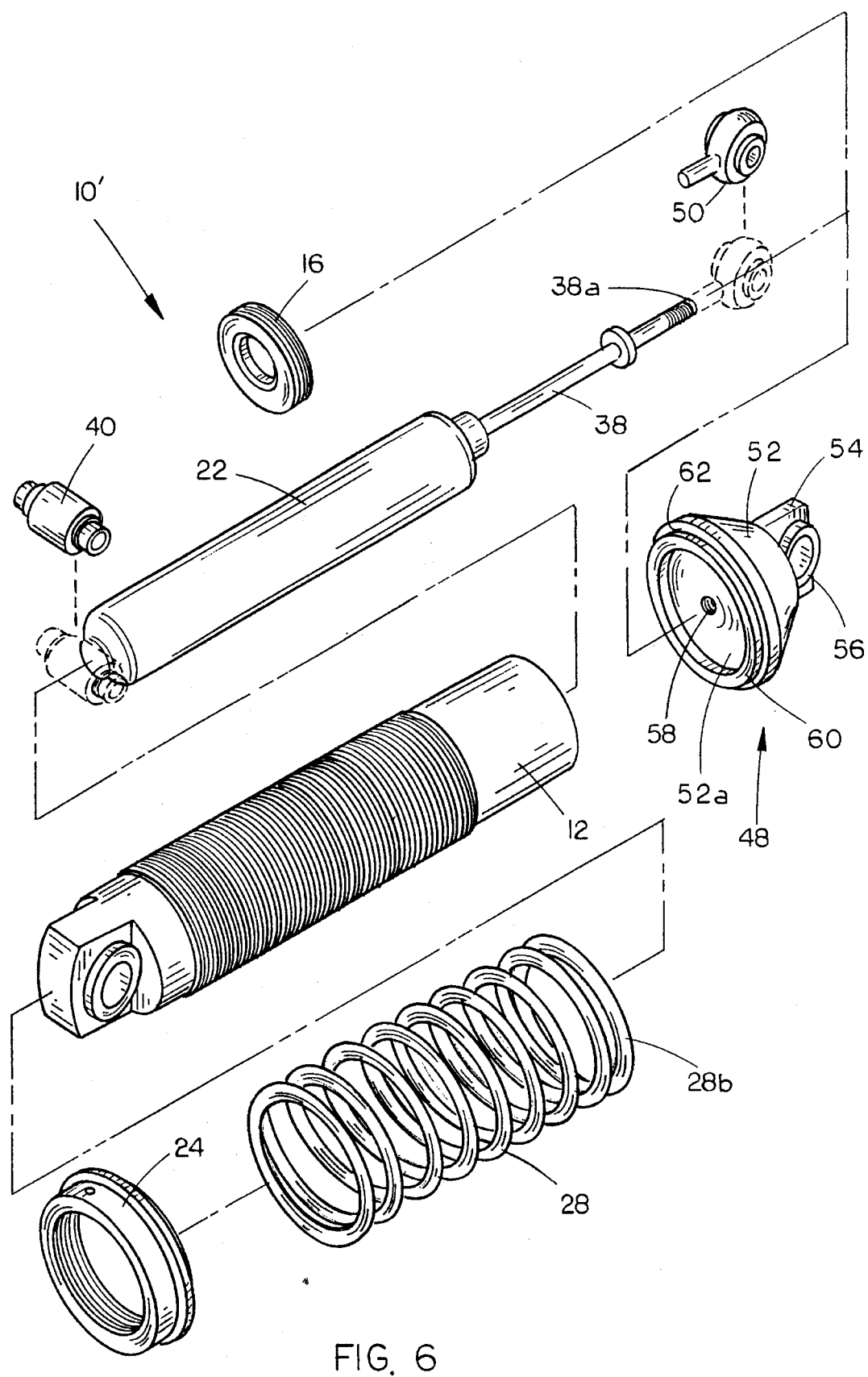
FIG. 6 is an exploded perspective view of a second embodiment of the invention.

Referring now to FIG. 6, a second embodiment of the shock absorber adapter kit of the present invention is designated generally at 10' and includes the same barrel 12, securement ring 16, lower spring seat 24 and coil spring 28 of the first embodiment. The second embodiment provides an additional modification to the conventional shock absorber 22 and provides an upper shock mount and spring seat unit 48.

The lower end of the shock absorber receiver tube is modified in the same fashion of the first embodiment, by removing the lower shock mount 40. However, in the second embodiment of the invention, the upper shock mount 50 of shock absorber 22 is removed by severing plunger rod 38 adjacent upper shock mount 50. The free end 38a of plunger 38 is then threaded to receive an aluminum upper shock mount spring seat unit 48.

Preferably, unit 48 includes a truncated conical aluminum body 52 having a projecting shock mount 54 with a tubular rubber bushing 56 fitted therein, and attached to the upper end of body 52. An interiorly threaded aperture 58 is formed in the lower face 52a of body 52, and corresponds with the threaded plunger end 38a. An annular ring 60 is formed on the body rearward face 52a and projects rearwardly therefrom. Ring 60 has an outer diameter less than the diameter of rearward face 52a, so as to form a spring seat 62 outwardly of the ring 60 on body rearward face 52a. In this way, the upper end 28b of coil spring 28 will fit around the outside diameter of ring 60 and contact seat 62 of body 52.

Whereas the shock absorber adapter of the present invention has been shown and described in connection with the preferred embodiment thereof, many modifications, substitutions and additions may be made which are within the intended broad scope of the appended claims.

I claim:

1. An adapter kit for receiving a modified shock absorber having no receiver tube shock mount at a lower end thereof, comprising:

an elongated barrel having upper and lower ends and a cavity formed therein for receiving a modified shock absorber receiver tube;

said barrel having a cylindrical outer surface threads thereon extending from the lower end upwardly towards the upper end;

said barrel having a lower end with an arcuate depression formed generally centrally in a lower end wall corresponding to and for receiving the modified shock absorber receiver tube lower end;

a shock mount on the lower end of the barrel for attaching the barrel to an axle assembly;

an annular spring seat threaded on said barrel outer surface threads for adjustment along the length of the barrel;

said spring seat having an outwardly projecting annular flange with an upper surface thereon for contact with a coil spring;

said barrel upper end having an opening therein for receipt of a plunger of said modified shock absorber therethrough, said opening having a diameter less than the diameter of the cavity;

said barrel upper end removably connected to the barrel to permit access to the cavity.

2. The adapter kit of claim 1, wherein said barrel upper end is a securement ring removably mounted in an upper end of said cavity, said upper end opening located in the center of said ring.

3. The adapter kit of claim 2, wherein said securement ring has a cylindrical outer surface with threads formed thereon, and wherein said barrel upper end has an inner surface which has threads formed therein extending downwardly from the upper end of the cavity to engage the threads of the securement ring outer surface.

4. The adapter kit of claim 2, wherein said securement ring includes a generally cylindrical inner surface, an annular lower surface orthogonal to the inner surface, and a bevel formed along the juncture of the inner and lower surfaces.

5. An adjustable shock absorber, comprising:

an elongated barrel having upper and lower ends and a cavity formed therein;

a shock absorber receiver tube having a lower end and a reciprocating plunger projecting from an upper end, the receiver tube completely enclosed within said barrel cavity with the plunger projecting out of an opening formed in the upper end of the barrel;

said receiver tube lower end being arcuate, and a lower end of said barrel cavity having a depression corresponding to and receiving the receiver tube arcuate lower end;

said barrel upper end removably connected to the barrel to permit access to the cavity;

said barrel having a cylindrical outer surface with threads thereon extending upwardly from the lower end thereof;

a lower shock mount on the lower end of the barrel for attaching the barrel to an axle assembly;

an upper shock mount on an upper end of the plunger for attaching the shock absorber to a vehicle frame; and a lower annular spring seat threaded on said barrel outer surface threads, for adjustment along the length of the barrel;

said spring seat having an outwardly projecting annular flange with an upper surface thereon for contact with a coil spring.

6. The shock absorber of claim 5, wherein said barrel upper end is a securement ring removably mounted in an upper end of said cavity, said upper end opening located in the center of said ring.

7. The shock absorber of claim 6, wherein said securement ring includes an outer cylindrical surface with threads formed thereon engaging an interiorly threaded surface in the upper end of said barrel cavity.

8. The shock absorber of claim 5, wherein said upper shock mount includes a body removably mounted on the upper end of the plunger.

9. The shock absorber of claim 8, wherein said upper shock mount body includes an upper annular spring seat formed on a lower end thereof for contact with an upper end of the coil spring.

10. The shock absorber of claim 9, wherein said upper shock mount body further includes an annular ring projecting downwardly from the body lower surface, said ring having an outer diameter less than a diameter of the body lower surface to form said upper spring seat.

11. A method for converting a shock absorber to an adjustable shock absorber, comprising the steps of:

removing a lower shock mount from a lower end of a shock absorber receiver tube, to leave a smooth, arcuate lower end on a modified receiver tube;

inserting the modified receiver tube into a cavity formed in a barrel, with the receiver tube lower end in contact with the lower end of the barrel cavity and a plunger projecting upwardly from an upper end of the receiver tube and out of the barrel cavity;

journaling a securement ring having a central opening, over the plunger and attaching the ring to the upper end of the barrel to secure the receiver tube within the barrel;

threading an annular lower spring seat onto threads on the exterior of the barrel, to a predetermined position along the barrel;

connecting a lower shock mount on the lower end of the barrel to a vehicle axle assembly;

seating a coil spring on the lower spring seat with the spring surrounding the barrel and projecting upwardly therefrom; and connecting an upper shock mount located on an upper end of the plunger to a vehicle frame with an upper end of the spring seated on an upper spring seat on the frame.

12. A method for converting a shock absorber to an adjustable shock absorber, comprising the steps of:

removing a lower shock mount from a lower end of a shock absorber receiver tube, to leave a smooth, arcuate lower end on a modified receiver tube;

removing an upper shock mount from an upper end of a shock absorber plunger, leaving a plunger free end;

forming threads on the plunger free end;

inserting the modified receiver tube into a cavity formed in a barrel, with the receiver tube lower end in contact with the lower end of the barrel cavity and a plunger projecting upwardly from an upper end of the receiver tube and out of the barrel cavity;

journaling a securement ring having a central opening, over the plunger and attaching the ring to the upper end of the barrel to secure the receiver tube within the barrel;

threading an annular lower spring seat onto threads on the exterior of the barrel, to a predetermined position along the barrel;

threading a mount body on to the plunger threaded end, said body having a shock mount formed on an upper end and a spring seat formed on a lower end thereof;

connecting a lower shock mount on the lower end of the barrel to a vehicle axle assembly;

seating a coil spring on the lower spring seat with the spring surrounding the barrel and projecting upwardly therefrom;

seating the coil spring upper end onto the upper shock body spring seat; and connecting the upper body shock mount to a vehicle frame.

13. An adjustable shock absorber, comprising:

an elongated barrel having upper and lower ends and a cavity formed therein;

a shock absorber receiver tube having a lower end and a reciprocating plunger projecting from an upper end, the receiver tube completely enclosed within said barrel cavity with the plunger projecting out of an opening formed in the upper end of the barrel;

said barrel upper end including a securement ring removably mounted in an upper end of said cavity to permit access to the cavity, said upper end opening located in the center of said ring;

said securement ring including a cylindrical inner surface, an annular lower surface orthogonal to the inner surface, and a bevel formed along the juncture of the inner and lower surfaces, and said receiver tube upper end having an arcuate upper end in flush contact with said securement ring bevel;

said barrel having a cylindrical outer surface with threads thereon extending upwardly from the lower end thereof;

a lower shock mount on the lower end of the barrel for attaching the barrel to an axle assembly;

an upper shock mount on an upper end of the plunger for attaching the shock absorber to a vehicle frame; and a lower annular spring seat threaded on said barrel outer surface threads, for adjustment along the length of the barrel;

said spring seat having an outwardly projecting annular flange with an upper surface thereon for contact with a coil spring.

* * * * *